United States Patent [19]

He et al.

[11] Patent Number: 5,424,375
[45] Date of Patent: Jun. 13, 1995

[54] PROCESS FOR THE MANUFACTURE OF A POLYMERIC MATERIAL CONTAINING INTERPENETRATED POLYSILOXANE-POLYACRYLIC NETWORKS

[75] Inventors: Xiongwei He, Gangzhou, China; Jean-Edouard Herz, Barr, France; Guy Meyer; Jean-Michel Widmaier, both of Strasbourg, France

[73] Assignee: Norsolor, Paris, France

[21] Appl. No.: 34,620

[22] Filed: Mar. 19, 1993

Related U.S. Application Data

[63] Continuation of Ser. No. 499,494, Aug. 28, 1990, abandoned.

[30] Foreign Application Priority Data

Dec. 29, 1987 [FR] France ................... 87 18317

[51] Int. Cl.⁶ .................................. C08F 783/12
[52] U.S. Cl. ................... 525/479; 525/100; 525/903; 528/25; 528/26
[58] Field of Search ............ 525/903, 479, 100, 101; 528/25, 26

[56] References Cited

U.S. PATENT DOCUMENTS

| | | | |
|---|---|---|---|
| 4,302,553 | 11/1981 | Frisch et al. | 528/28 |
| 4,322,517 | 3/1982 | Deubzer et al. | 528/14 |
| 4,618,644 | 10/1986 | Liu | 524/535 |
| 4,894,415 | 1/1990 | Sasaki | 525/68 |
| 5,006,581 | 4/1991 | Nakane et al. | 524/266 |

FOREIGN PATENT DOCUMENTS

| | | | |
|---|---|---|---|
| 315836 | 5/1989 | European Pat. Off. | 521/479 |
| 2365606 | 4/1978 | France . | |
| 1480880 | 7/1977 | United Kingdom . | |

OTHER PUBLICATIONS

*Concise Encyclopedia of Polymer Science and Engineering,* 1990, pp. 489–492; 644–645.

X. W. He et al., "Polydimethylsiloxane/poly(methyl methacrylate) Interpenetrating Polymer Networks: 2. Synthesis and Properties," *Polymer*, 33(4), 1992, 866–871.

Primary Examiner—Ralph H. Dean
Attorney, Agent, or Firm—Finnegan, Henderson, Farabow, Garrett & Dunner

[57] ABSTRACT

The polysiloxane network (1) of this polymeric material is formed by (1a) at least one $\alpha,\omega$-dihydroxylated polydimethylsiloxane and/or an $\alpha,\omega$-dihydroxylated poly(dimethyldiphenyl)siloxane containing at least 70% of dimethylsiloxane units; (1b) a crosslinking agent and/or a bridging agent ensuring the crosslinking as well as a bond between the networks; optionally (1c) a polycondensation catalyst. The acrylic network (2) is formed by (2a) at least one (meth)acrylic monomer containing no hydrophilic functional group; optionally (2b) a crosslinking agent and (2c) a radical polymerization initiator. The polymerization mixture contains all these constituents and sufficient inhibitor of free radical formation to prevent, at the outset, the initiator (2c) producing radicals which, combined with the catalyst (1c) would annihilate the catalytic properties of the latter, to form the network (1) before the network (2). Application: manufacture of articles of all shapes.

3 Claims, No Drawings

PROCESS FOR THE MANUFACTURE OF A POLYMERIC MATERIAL CONTAINING INTERPENETRATED POLYSILOXANE-POLYACRYLIC NETWORKS

This application is a continuation of application Ser. No. 07/499,494, filed Aug. 28, 1990, now abandoned.

This application is a continuation of international application PCT/FR88/00646 (WO 89/06249).

The present invention relates, on the one hand, to a polymeric material containing interpenetrating polysiloxane-polyacrylic networks, on the other hand to a process for the manufacture of articles made of this polymeric material and, lastly, to the optionally transparent articles consisting of the said material, it being possible for these articles to constitute objects of various shapes, and especially to be in the form of sheets, foils or films and finding application as glazing, bulletproof screens, and the like.

In polymer chemistry there are known interpenetrating polymer networks (IPNs) which result from the interconnection of two polymers by overlapping of their chains, each polymer being in the main crosslinked with itself.

It is known, furthermore, that organopolysiloxanes, for example polydimethylsiloxanes (PDMS) have special physicochemical properties, among which may be mentioned a low glass transition temperature, a high flexibility, a low wettability and a high gas permeability. From this it has been concluded that these characteristics could lead to advantageous properties of IPNs. Studies of interpenetrating polymeric networks based on organopolysiloxanes have therefore been undertaken.

Thus, French Patent Application no. 2,270,289 and its Certificate of Addition no. 2,365,606 describe a process for the manufacture of shaped bodies, in particular contact lenses based on hydrophobic polymer/hydrophilic polymer IPNs, the hydrophobic network being formed by crosslinking organopolysiloxane prepolymers containing vinyl functional groups, and the hydrophilic network being formed by polymerizing monoesters of acrylic or methacrylic acid containing at least one hydrophilic functional group. Similarly, European Patent Application No. 19,738 concerns a process for the manufacture of contact lenses by polymerization of a hydroxyalkyl (meth)acrylate, by means of free radicals, in the presence of a polyorganosiloxane, in contact with a convex moulding surface.

The present invention proposes a polymeric material consisting of a polysiloxane/polyacrylic IPN which offers a good balance of mechanical and optical properties and which leads to a wide variety of objects which can be transparent, depending on the choice of the starting constituents, these articles having favourably the additional advantages associated with the polysiloxane network of having a low surface wettability and of having a smooth surface whose initial state can be reconstituted merely by heating, in the event of scratches.

From a first viewpoint, the invention relates to a polymeric material consisting of two interpenetrating polymeric networks, that is, an interpenetrating polymeric network of two different networks, one being a polysiloxane network (1) and the other being an acrylic network (2), characterized in that the said network (1) is essentially made up from:

(1a) at least one precursor polymer chosen from $\alpha,\omega$-dihydroxylated polydimethylsiloxanes and $\alpha,\omega$-dihydroxylated poly(dimethyldiphenyl)siloxanes containing at least 70% of dimethylsiloxane units; and (1b) an effective quantity of at least one agent for crosslinking the polymer(s) formed from (1a) and/or of at least one bridging agent intended to ensure the crosslinking of this (or these) polymer(s), thus forming a connection between the networks (1) and (2); and in that the said network (2) is essentially made up from:

(2a) at least one acrylic or methacrylic main monomer containing no hydrophilic functional group.

The constituents (1a) and (2a) are generally employed in a weight ratio of 5/95 to 95/5.

Another constituent of the network (2) may also be:

(2b) an effective quantity of at least one agent for crosslinking the monomer(s) (2a).

The two macromolecular networks are physically interpenetrating, forming IPNs when a constituent (2b) is present and semiinterpenetrating networks (abbreviated to semi-IPNs) in the absence of (2b). These networks are optionally consolidated by means of grafting bonds between the two networks when the constituent (1b) is or comprises a bridging agent.

In a preferred embodiment, the polymeric material of the invention also includes:

(1c) at least one polycondensation catalyst which has been employed for forming the network (1);

(2c) at least one radical polymerization initiator which has been employed for forming the network (2); and (I) at least one inhibitor of free radical formation, in sufficient quantity to prevent, at the outset, the production, by the initiator (2c), of free radicals which, by combining with the catalyst (1c), would annihilate the catalytic properties of the latter.

From a second viewpoint, the invention relates to a process for the manufacture of an articles made of a polymeric material in accordance with the abovementioned preferred embodiment, this process being characterized in that:

(I) in a first stage, a mixture of all the constituents of the networks (1) and (2) is produced, the constituent (1c) being incorporated into the said mixture last, in order to permit the formation of the network (1) before that of the network (2);

(II) in a second stage, the mixture obtained is introduced into a mould, at ambient temperature;

(III) in a third stage, as soon as the mixture placed in the mould has formed a gel, the temperature is raised to a value of approximately between 40° C. and 80° C.; and (IV) in a fourth stage, the polymerized mixture is allowed to cool in the mould, before demoulding is performed.

A. THE CONSTITUENTS OF NETWORK (1)

As constituent (1a) there is chosen especially a polydimethylsiloxane or a polydimethyldiphenylsiloxane with a molecular mass of approximately between 300 and 30,000, preferably with a molecular mass lower than approximately 5,000. In the case where an $\alpha,\omega$-dihydroxylated polydimethyldiphenylsiloxane is employed, the latter preferably contains at least 85% of dimethylsiloxane units. The constituents (1a) which are preferred are, however, polydimethylsiloxanes with a molecular mass lower than approximately 5,000.

As crosslinking agent (1b) there may be employed especially:

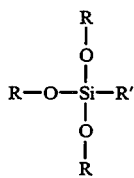

where:
each R is a methyl or ethyl group; and
R' denotes hydrogen, ethyl or ethyl;
tetraalkyloxysilanes of formula:

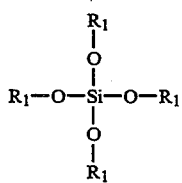

where
each $R_1$ denotes methyl, ethyl, propyl and butyl, as well as compounds of formula:

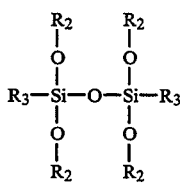

where:
$R_2$ denotes methyl; and
$R_3$ denotes methyl or ethyl.

As bridging agents (1b) there is employed especially a trialkyloxysilane containing an unsaturated group such as a vinyl, acryloyl, ethyacyloyl, allyl or similar group.

The constituent (1b) is employed in a quantity such that the ratio of the number of the functional groups responsible for forming the network of the said constituent (1b) to the number of SiOH functional groups of the prepolymer (1a) (or stoichiometric ratio K of forming the network (1)) is approximately between 1 and 4.

As for the catalyst (1c), this is advantageously chosen from organic salts of tin, zinc, and iron, as well as from titanates. Stannous octoate is preferably employed. The catalyst (1c) is preferably employed in a proportion of approximately between 0.5% and 2.5% by weight relative to the total of the IPN.

B. THE CONSTITUENTS OF THE NETWORK (2)

With regard to the main acrylic and methacrylic monomers (2a), these are chosen especially from $C_1$-$C_{12}$ alkyl acrylates and methacrylates. Methyl methacrylate is employed in a particularly preferred manner.

The network (2) can, if appropriate, comprise:
(2d) at least one monomer containing copolymerizable ethylenic unsaturation which may be chosen especially from vinylaromatic hydrocarbons such as styrene, α-methylstyrene, tert-butylstyrene, vinyltoluene and imides such as N-phenylmaleimide.

When such comonomers are added, they are present in a total proportion preferably not exceeding approximately 20% by weight relative to the main monomers (2a).

As for the constituent (2b), which is present especially in a quantity not exceeding approximately 10% relative to the monomers (2a), this is chosen especially from:
compounds containing at least two polymerizable double bonds; and
compounds containing at least one polymerizable double bond and at least one functional group reactive towards the acrylic monomer and, if appropriate, its comonomer, when such a comonomer is present, as shown hereinafter.

As examples of compounds containing at least two polymerizable double bonds which can be employed as constituents (2b), there may be mentioned:

(a) di- or polyvinyl compounds such as, especially divinylbenzene, divinyltoluene, divinylxylene, divinyl ether, divinyl ketone and trivinylbenzene;

(b) di- or polyesters of unsaturated mono- or polycarboxylic acids with polyols, such as esters of di- or tri(meth)acrylic acids with polyols (such as ethylene glycol, trimethylolpropane, glycerol, polyoxyethylene glycols, polyoxypropylene glycols, and the like), unsaturated polyesters (which can be obtained by reaction of any one of the abovementioned polyols with an unsaturated acid such as maleic acid), and the like;

(c) bis(meth)acrylamaides such as N,N-methylenebisacrylamide;

(d) carbamyl esters which can be obtained by reacting polyisocyanates (such as toluene diisocyanates, hexamethylene diisocyanate, 4,4'-diphenylmethane diisocyanate, and the like, and prepolymers containing an NCO group which are obtained by reacting such a diisocyanate with compounds containing active hydrogen atoms), with monomers containing hydroxyl groups. Such esters are especially those of di- (meth)acrylic acids which can be obtained by reacting the abovementioned diisocyanates with hydroxyethyl (meth)acrylate;

(e) di- or poly(meth)allyl ethers of polyols such as alkylene glycols, glycerols, polyalkylene glycols, polyoxyalkylene polyols, carbohydrates, and the like), such as polyethylene glycol diallyl ether, allylates starch and allylated cellulose;

(f) di- or polyallyl esters of polycarboxylic acids, such as diallyl phthalate, diallyl adipate and the like; and (g) esters of unsaturated mono- or polycarboxylic acids with mono(meth)allyl ethers of polyols, such as the ester of (meth)acrylic acid with polyethylene glycol monoallyl ether.

N-Methylol(meth)acrylamide and glycidyl (meth)acrylate may be mentioned by way of examples of compounds containing at least one polymerizable double bond and at least one functional group reactive towards the monomer (1a) and, where appropriate, its comonomer.

Among the constituents (2b) which are preferred, there may be mentioned the di(meth)acrylates of hexanediol, of neopentylglycol, of mono-, di- or triethylene glycol and of butanediol, the tri(meth)acrylates of trimethylolpropane and of pentaerythritol, and pentaerythritol tetra(meth)acrylate.

The radical polymerization initiator (2c) may be chosen especially from persulphates, peroxides, hydroperoxides and diazo compounds such as, for example, azobisisobutyronitrile, 2,2'-azobis(2,4-dimethylvaleronitrile), 1,1'-azobis-1-cyclohexanecarbonitrile, tert-butyl perbenzoate, tert-butylperoxy isopropyl carbonate, and the like; when an alkali metal persulphate is chosen as an initiator, it may be employed in combination with at least one reducing agent chosen from polyhydrophenols, sodium sulphite and bisulphite, dimethylaminopropionitrile, diazomercaptans and ferricyanides. The initiator and, where appropriate, the reducing agent can be employed in a proportion of approximately 0.1% to 2% of each by weight relative to the acrylic or methacrylic monomer (2a) present in the mixture.

C. THE INHIBITOR (I)

The inhibitor (I) may be chosen from the following classical inhibitors, for example from sterically hindered phenols such as 4-tert-butylpyrocatechol and 2,6-di-tert-butyl-4-methylphenol, hydroquinone and benzophenone. The inhibitor (I) is preferably employed in a proportion of between approximately 0.1% and 0.2% by weight relative to the monomer(s) (2a).

If a proportion of inhibitor (I) which is lower than 0.1% by weight is employed, the protection of the catalyst (1c) will not be ensured, in other words the formation of the network (1) will not be ensured; moreover, if a proportion of inhibitor (I) exceeding 0.2% by weight is employed, it will be necessary to wait for a very long time to see the gel forming (which is generally of the order of 0.3–2 hours), so that it is pointless to exceed the value of 0.2% which is indicated.

D. POSSIBLE ADJUVANTS

The polymeric material of the invention may also include:
- an effective quantity of at least one chain limiter which may be chosen especially from diunsaturated monocyclic terpenes and monounsaturated bicyclic terpenes, preferably, in a proportion of approximately between 0.05% and 1% by weight relative to the total quantity of monomer (2a);
- an effective quantity of at least one flameretardant such as, especially, tribromophenyl methacrylate or organophosphorus compounds such as those described in patents EP-A-117,174 and FR-A-2,567,127;
- an effective quantity of at least one pigment which is soluble in the monomer(s) (2a);
- an effective quantity of at least one ultraviolet radiation absorber chosen preferably so as not to be capable of reacting with the constituents and/or with the catalysts; and
- an effective quantity of at least one demoulding agent chosen, for example, from stearic acid, sodium dioctysulphosuccinate and organic phosphoric esters, (such as, for example, the Phosphac D10N marketed by Protex); this demoulding agent is generally employed in a proportion of approximately 0.01% to 2% by weight relative to the total quantity of acrylic or methacrylic monomer (2a) present in the mixture; the presence of such a demoulding agent is more particularly recommended when the mould employed consists of an inorganic glass and/or when it is desired to obtain transparent flat sheets which have a perfect surface state.

E. THE PROCESS OF THE INVENTION

As already indicated, the first stage is that of simply mixing all the constituents of the two networks at ambients temperature, it being known that care has been taken to introduce the catalyst (1c) only at the last moment.

In the second stage, the mixture obtained in the first stage, after degassing if desired, is introduced into a mould at ambient temperature.

When it is desired to obtain cast sheets, the moulds employed may be of the type of those used in the manufacture of polymethyl methacrylate. Thus, they consist especially of two flat glass sheets kept apart by a peripheral gasket ring, the sheets being held by mould closing clamps. Once the gasket ring has been mechanically positioned between the sheets, the clamps are arranged on three sides, the mixture is introduced via a tube via the fourth side of the mould; after filling, the missing clamps are placed in position and air is expelled from the mould. During the polymerization cycle the mould undergoes volume changes which are the consequences of the changes in the density of the reaction mixture with temperature and the degree of polymerization. Such volume changes are partially supported by the gasket ring.

To make it easier to demould the cast sheets it may be desirable to provide a mould consisting of a treated inorganic glass, for example an inorganic glass coated with an inorganic layer such as a layer of metal oxide, hardened by pyrolysis.

In addition, to prevent the networks (1) and (2) forming before the desired time, it may be advantageous to employ a mould consisting of a material which makes it possible to prevent the photocatalysis of polymerization of any of the monomers present. The mould employed for making use of the process according to the present invention must, furthermore, withstand the maximum temperature of the reaction mixture and must be unreactive or insoluble in contact with the liquid charge. Suitable moulds are therefore also made from substances such as, for example, polyethylene, polypropylene, polyethylene terephthalate, silicone elastomers, Teflon and metals such as, for example, aluminium, copper, nickel, or alloys such as brass or stainless steel. A metal mould would be more particularly suited when the process according to the invention is carried out continuously, for example in a plant of the rolling mill type.

Since the objects of the invention are not necessarily flat, moulds of other shapes will also be produced, also made of the materials indicated above.

Furthermore, especially in the case of the manufacture of contact lenses, the latter can be shaped directly by pouring the reaction mixture into a mould of suitable shape and by employing casting or centrifugal casting techniques.

When all the components of the system are in the mould, a gel forms first, showing that the elastomeric network (1) has formed. Then, when the mould is heated (third stage of the process), the free-radical initiator (2c) produces sufficient radicals, despite the presence of the inhibitor (I), to permit the polymerization which is to form the network (2).

With regard to the duration of this third stage, a total duration preferably comprising approximately between 2 and 60 hours (at atmospheric pressure) may be indicated.

After the demoulding there generally follows an annealing at a temperature of at least 70° C., under vacuum if appropriate.

When it is desired to obtain transparent articles (organic glasses), a constituent (1a) of low molecular mass is chosen and/or the stoichiometric ratio of formation of the network (1) (ratio K) is increased and/or covalent grafting bonds are created between the networks (1) and (2) by the use of the bridging agent, such as defined above. However, a compromise needs to be found to prevent the material losing in elasticity that it gains in transparency. The transparency, determined by measuring the light transmission (ASTM standard D 1003) can attain values as high as 90%.

The objects obtained by the process of the invention are also advantageous because of their surface properties, which are dominated by those of the network (1) whatever the composition of the IPNs. The surface layer of an object obtained by the process of the invention consists of a layer of polymer of network (1) over a thickness of the order of 5 nm. Thus, the wettability of these objects, especially by water, is very low. Moreover, it has been verified that, if this surface layer is removed by abrasion, the surface energy increases, but its initial value is recovered after a certain time (12 months). It has also been verified that a sheet which has been subjected to an abrasion and then heated recovers this initial surface energy value very quickly. Thus, if transparent products of the "organic glasses" type are made from the material of the invention, these offer the advantage of being capable, in the case of scratches, of recovering their surface state merely by being heated for a short time.

The process according to the present invention permits, inter alia, the manufacture of cast sheets of high impact strength, as well as the manufacture of foils and films. The thickness of the articles thus obtained may vary between 1/10 of a millimeter and 50 mm.

These cast sheets according to the invention find a particularly wide application in the production of glazing, of advertising signs and of bulletproof screens which can be used in the various sectors of public safety. Secondly, after folding or curving, these sheets can also be employed in the field of external orthopaedics.

Various manufactures of cast sheets which have been manufactured by the process in accordance with the present invention will be described in greater detail below, by way of guidance and without any limitation being implied. The reactants employed in these examples have been referred to by the following abbreviations:

PDMS: $\alpha,\omega$-disilanolpolydimethylsiloxane
MMA: methyl methacrylate
TEOS: tetraethyl orthosilicate
TMSPM: trimethoxysilylpropyl methacrylate
SnOc: stannous octoate
TRIM: trimethylolpropane trimethacylate
AIBN: azobisisobutyronitrile
TBPC: 4-tert-butylpyrocatechol.

Sixteen sheets cast by the process of the invention (Examples 1 to 16) were prepared using the following common operating procedure:

Stirring is used to homogenize properly the reaction mixture consisting of all the constituents corresponding to a given composition, except for the SnOc catalyst; this catalyst is then added, allowing the formation of the network (1) to commence. After the catalyst has been well incorporated with energetic stirring, the mixture is injected into a mould consisting of two glass sheets and a peripheral gasket ring with a thickness of approximately 3.5 mm. The mould is left at ambient temperature, sheltered from light, for 2 hours, before being heated to 60° C. by means of a thermostated water bath for another 2 hours, with a view to initiating the network (2). The mould is then transferred into an oven controlled at 90° C. and is left at this temperature for 12 hours. After demoulding, an annealing at 120° C. is carried out for 3 hours under vacuum.

Starting with sixteen different mixtures, sheets were prepared, the transparency (ASTM standard D 1003) of each of these being investigated, together with the surface energies, initially, then after abrasion, and then after annealing (droplet angle method).

The results obtained are collated in the table below.

TABLE

| Ex. n° | PDMS/PMMA(1) | PDMS1(2) (g) | PDMS2(3) (g) | TEOS (g) | TMSPM(4) (g) | K | SnOc (g) | MMA (g) | TRIM (g) | AIBN (g) | TBPC (g) | T(5) (%) | γ(6) s.o (mJ/m²) | γ(7) s.ab (mJ/m²) | γ(8) s.ab.tr (mJ/m²) |
|---|---|---|---|---|---|---|---|---|---|---|---|---|---|---|---|
| 1 | 30/70 | 24.9 | | 0.6 | | 1 | 2.1 | 56.7 | 3.0 | 0.3 | 0.06 | 0 | 25 | 35 | 24 |
| 2 | 50/50 | 39.2 | | 1.0 | | 1 | 2.0 | 35.3 | 2.0 | 0.2 | 0.04 | 0 | 24 | | |
| 3 | 60/40 | 17.6 | | 0.4 | | 1 | 0.8 | 11.4 | 0.6 | 0.06 | 0.01 | 0 | 24 | | |
| 4 | 85/15 | 49.8 | | 1.2 | | 1 | 1.6 | 8.6 | 0.5 | 0.04 | 0.01 | 0 | 24 | | |
| 5 | 30/70 | 9.9 | | 0.7 | | 3 | 0.9 | 23.6 | 1.2 | 0.1 | 0.02 | 17 | | | |
| 6 | 7.5/92.5 | 7.6 | | | 0.6 | 2 | 2.2 | 98.3 | 5.2 | 0.5 | 0.1 | 1 | | | |
| 7 | 10/90 | 10.4 | | | 0.8 | 2 | 2.2 | 95.9 | 5.0 | 0.5 | 0.1 | 24 | 28 | 48 | 27 |
| 8 | 30/70 | 25.0 | | | 2.0 | 2 | 2.2 | 61.0 | 3.2 | 0.3 | 0.05 | 45 | | | |
| 9 | 30/70 | 9.1 | | | 1.4 | 4 | 0.8 | 22.4 | 1.2 | 0.1 | 0.02 | 62 | | | |
| 10 | 70/30 | 51.9 | | | 4.1 | 2 | 2.0 | 23.0 | 1.2 | 0.1 | 0.02 | 46 | | | |
| 11 | 10/90 | | 9.9 | 1.2 | | 1 | 2.2 | 94.4 | 5.0 | 0.5 | 0.1 | 1 | 31 | 48 | 31 |
| 12 | 20/80 | | 19.8 | 2.4 | | 1 | 2.2 | 84.1 | 4.4 | 0.4 | 0.1 | 42 | | | |
| 13 | 5/95 | | 4.7 | | 1.8 | 2 | 2.6 | 117.2 | 6.1 | 0.6 | 0.1 | 88 | 38 | 50 | 36 |
| 14 | 10/90 | | 2.2 | | 0.8 | 2 | 0.6 | 26.4 | 1.4 | 0.1 | 0.02 | 85 | 35 | 46 | 31 |
| 15 | 30/70 | | 11.0 | | 4.6 | 2 | 1.0 | 36.7 | 1.9 | 0.2 | 0.04 | 85 | 32 | | |
| 16 | 50/50 | | 12.4 | | 4.8 | 2 | 0.6 | 16.3 | 0.9 | 0.09 | 0.02 | 81 | 31 | 41 | 30 |

Notes:
(1)Weight ratio
(2)pDMS1: α,ω-disilanolpolydimethylsiloxane of Mn 4200
(3)pDMS2: α,ω-disilanolpolydimethylsiloxane of Mn 860
(4)K: ratio of the number of the Si—OC$_2$H$_5$ functional groups of TEOS to the number of the Si—OH functional groups of PDMS (or stoichiometric ratio of the formation of the PDMS network).
(5)Light transmission of the IPNs (λ = 700 nm), measured on samples with a thickness of 3.5 ± 0.2 mm
(6)γ$_{s,o}$ = initial surface energy of the IPNs synthesized
(7)γ$_{s,ab}$ = surface energy of these same IPNs after they have been subjected to a surface abrasion greater than at least 100 μm
(8)γ$_{s,ab,tr}$ = surface energy of these abraded IPNs after they have been treated by annealing at 120° C. for at least 2 hours.

The results obtained relating to the measurement of surface energies show the recovery of the surface state by heating in all cases.

We claim:

1. Process for the manufacture of an article made from a composition of polymeric materials for preparing an interpenetrating polymer network of a polysiloxane network (1) and an acrylic or a methacrylic network (2), which comprises:

for forming said polysiloxane network (1):
- (1a) at least one precursor polymer selected from $\alpha,\omega$-dihydroxylated polydimethylsiloxanes or $\alpha,\omega$-dihydroxylated poly(dimethyldiphenyl)-siloxanes containing at least 70% of dimethyl siloxane units;
- (1b) an effective quantity of at least one agent for crosslinking the polymer formed from (1a) and/or of at least one bridging agent to ensure the crosslinking of the polymer formed from (1a) and also for forming a connection between the networks (1) and (2); and
- (1c) at least one polycondensation catalyst for forming the network (1); and for forming said acrylic or methacrylic network (2):
- (2a) at least one acrylic or methacrylic main monomer containing no hydrophilic functional group;
- (2b) optionally an effective quantity of at least one agent for crosslinking the monomer (2a); and
- 2c) at least one radical polymerization initiator for forming the network (2); and a sufficient quantity of at least one inhibitor of free radical formation to prevent, at the outset, the production, by the initiator (2c), of free radicals which, by combining with the catalyst (1c), would annihilate the catalytic properties of the latter, in order to permit the formation of the network (1) before that of the network (2), said process comprising:

- (I) a first stage comprising mixing all the constituents of networks (1) and (2) and inhibitor (I), wherein the constituent (1c) is incorporated last;
- (II) a second stage comprising introducing the mixture obtained in the first stage into a mould, at ambient temperature;
- (III) a third stage comprising raising the temperature, as soon as the mixture placed in the mould has formed the gel of network (1), to approximately between 40° C. and 80° C. to form network (2); and
- (IV) a fourth stage comprising cooling the polymerized mixture in the mould and then demoulding the mixture;

wherein the resulting article is an interpenetrating polymer network of a polysiloxane network (1) and an acrylic or methacrylic network (2), wherein the interpenetrating network exhibits two different glass transition temperatures.

2. Process according to claim 1, wherein a degassing of the mixture from the first stage is carried out under vacuum before or after the introduction into the mould.

3. Process according to claim 1, wherein the polymerization of the third stage is carried out for approximately from 2 to 60 hours.

* * * * *

UNITED STATES PATENT AND TRADEMARK OFFICE
CERTIFICATE OF CORRECTION

PATENT NO. : 5,424,375
DATED : June 13, 1995
INVENTOR(S) : Xiongwei HE, Jean-Edouard HERZ, Guy MEYER and Jean-Michel WIDMAIER It is certified that error appears in the above-identified patent and that said Letters Patent is hereby corrected as shown below:

Claim 1, col. 11, line 29, "2c)" should read --(2c)--.

Signed and Sealed this

First Day of August, 1995

Attest:

BRUCE LEHMAN

Attesting Officer     Commissioner of Patents and Trademarks